US005444437A

United States Patent [19]

Layher

[11] Patent Number: 5,444,437
[45] Date of Patent: Aug. 22, 1995

[54] SIGNALING DEVICE

[76] Inventor: Francis W. Layher, 3433 W. Camino Christy, Tucson, Ariz. 85741

[21] Appl. No.: 152,451

[22] Filed: Nov. 12, 1993

[51] Int. Cl.[6] ........................ H01H 35/02; G01N 1/00

[52] U.S. Cl. .......................... 340/815.4; 200/61.45 R; 200/61.52; 340/286.11; 340/691; 340/693; 235/52; 235/54 F

[58] Field of Search ........... 340/321, 693, 691, 286.11; 200/61.45 R, 61.51; 434/208, 306, 322, 325, 327; 273/118 R; 235/50 B, 51, 52, 53, 54 A, 54 C, 54 F, 56

[56] References Cited

U.S. PATENT DOCUMENTS

| | | | |
|---|---|---|---|
| 1,162,853 | 12/1915 | Fitzpatrick | 235/53 |
| 3,190,014 | 6/1965 | Rhodes | 235/52 |
| 3,455,033 | 10/1966 | Han | 434/208 |
| 3,690,018 | 9/1972 | Arroyo | 434/208 |
| 4,020,302 | 4/1977 | Hasegawa et al. | 200/61.51 |
| 4,789,922 | 12/1988 | Cheshire | 200/61.51 |
| 5,081,568 | 1/1992 | Dong et al. | 340/321 |
| 5,248,959 | 9/1993 | Chern | 200/61.45 R |
| 5,278,540 | 1/1994 | Caban-Domenech | 200/61.45 R |

*Primary Examiner*—Ulysses Weldon
*Assistant Examiner*—Amare Mengistu
*Attorney, Agent, or Firm*—Baker, Maxham, Jester & Meador

[57] ABSTRACT

An apparatus for generating a signal for indicating consent between two parties, comprises a generally box-like housing having a cavity, an indicator light on an exterior portion of the housing, a source of electrical power including a battery in the housing, a circuit including a switch for selectively connecting the source of electrical power to the indicator light, the switch being disposed in the cavity and responsive to multiple actuators for activating the switch, and multiple actuator members positionable into the cavity for closing for closing the circuit and activating the indicator light.

15 Claims, 1 Drawing Sheet

SIGNALING DEVICE

BACKGROUND OF THE INVENTION

The present invention relates to signaling devices and pertains particularly to improved signaling device requiring multiple actuations for generating a signal.

There exist situations where it is desirable for two or more people to communicate certain information, such as an event, a condition or a state of mind non-verbally. For example, a husband or wife may want to convey a certain mood or state of mind to the other only if the other is in the same mood. It is desirable that the second party must take some positive action to know of the first parties mood or action. This would enable the parties to reach a mutual understanding or consent without fear of rebuff.

Another situation, such as where two parties may cross paths during the day may require such means of signaling. For example, a husband and wife may want some simple and effective means to signal that one has arrived home and left when the other arrives home. Other similar situations may arise for other parties.

The present invention was devised to enable two parties, who passed by a certain point in their daily rounds, to signal certain actions or state of mind such as consent or non-consent.

SUMMARY OF THE INVENTION

It is the primary object of the present invention to provide means to enable two or more parties to signal certain events, conditions or state of mind such as agreement or disagreement.

In accordance with the primary aspect of the present invention, an electrical circuit having a light as a means of signal, includes a source of electrical power and a switch requiring multiple actuation inputs to activate the signal light.

BRIEF DESCRIPTION OF THE DRAWINGS

The above and other objects and advantages of the present invention will become apparent from the following description when read in conjunction with the accompanying drawings wherein.

DETAILED DESCRIPTION OF THE PREFERRED EMBODIMENTS

Figure 1:
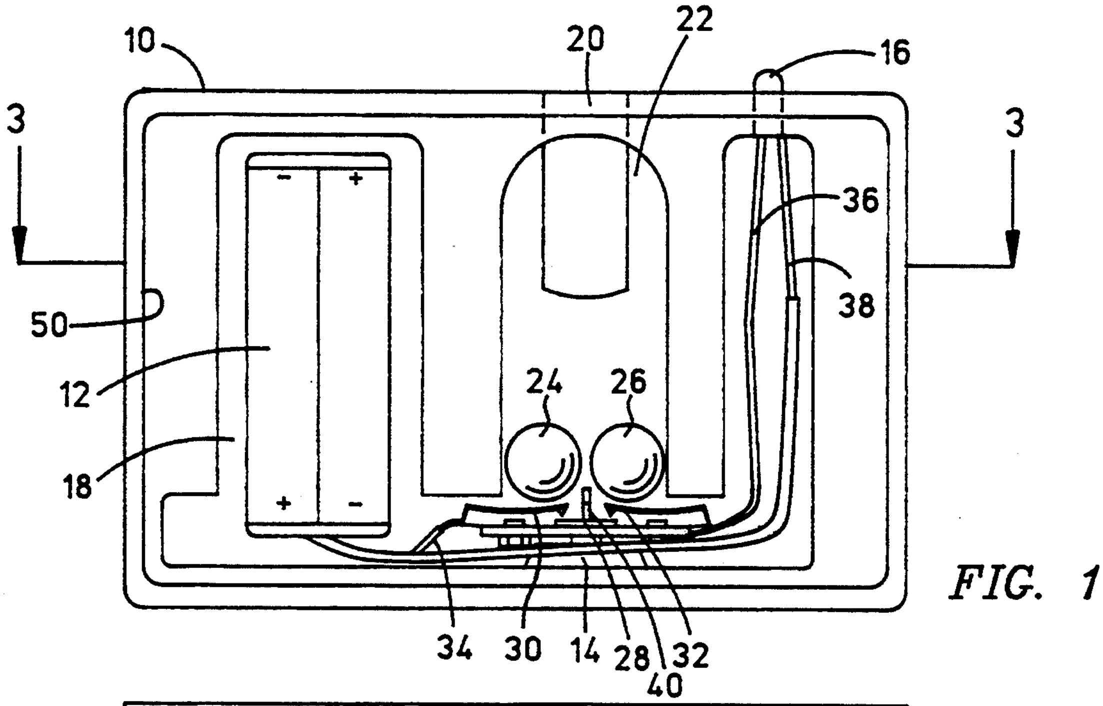
FIG. 1 is a side-elevation view of a preferred embodiment the invention with a housing cover removed to show details.
Figure 2:
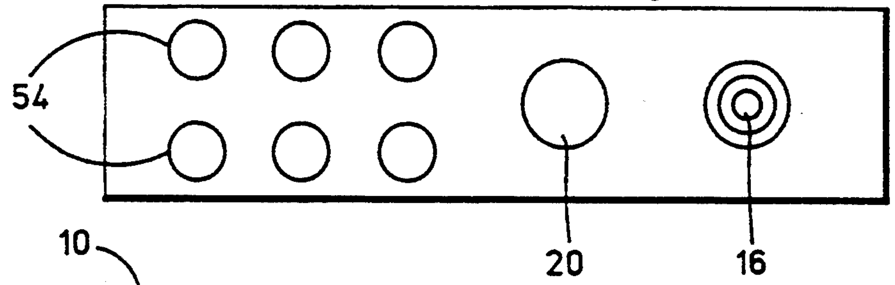
FIG. 2 is a top-view plan of the embodiment of FIG. 1.

Referring to FIG. 1, an apparatus in accordance with the invention comprises a housing 10, having a generally box-like configuration with chambers or cavities for mounting a source of power, such as a battery or battery pack 12, connected by circuit including a switch 14 to an indicator such as a LED 16. The housing may be constructed of any suitable material, such as wood, plastic, metal and other materials. The device is preferably self-contained and portable and therefore formed with a suitable cavity or mounting means, such as a cavity 18, for mounting a battery or pair of batteries 12, as illustrated. The switch 14 is disposed directly below an opening 20 and at the bottom of a containment shaft or passage 22 for guiding and containing suitable switch actuating means. In the present invention the switch actuating means comprises a pair of balls or spheres 24 and 26. The balls may be made of any suitable material such as steel, glass or other materials.

The switch 14 as illustrated comprises a central conductor member 28 mounted on suitable insulation, such as the housing or a support member. The central conductor member 28 has contact portions disposed directly below a pair of spring contact members 30 and 32. The leaf spring contact 30 is connected by a conductive lead 34 to one pole of the battery 12, such as the positive side. The leaf spring switch member 30 is biased to the normally non-contact position and is responsive to the weight of a ball 24 thereon for contacting the central conduct member 28. The switch 32 is identical to the switch 30 and comprises a leaf contact spring connected by a lead 36 to the LED 16. The leaf contact 32 is normally biased to a non-counting position and is responsive to the weight or presence of sphere 26 thereon to contact the center contact 28. The presence of both balls actuates both switches thus completes the circuit between the battery 12 and the LED 16. A third conductive lead 38 connects the opposite pole of battery 12, such as the negative pole to the corresponding pole of the LED 16. The switch assembly 14 includes the two switches 30 and 32 in series such that both switches must be in the closed position to complete the circuit. The light 16 is preferably an LED and the circuit includes means for causing the LED to flash.

The opening 20 is preferably of a size just slightly larger than that of the diameter of the balls, spheres 24 and 26. The containment cavity for channel 22 is preferably slightly greater in width than the diameter of two spheres. However, it has a length slightly larger than twice the diameter of the spheres to accommodate two spheres side-by-side as illustrated in FIG. 1.

A vertically extending pin 40 is preferably positioned proximate the center of the center of contact member 28 and extends upward to divert at least the first of the respective spheres or balls to either side of the respective spring contacts 24 and 26. The second sphere will be diverted by the first one. The switch assembly can be constructed to include any number of switches to require more than two balls to activate. Such an arrangement could be used by a club requiring a fixed minimum number of votes for approval of an item.

Figure 3:
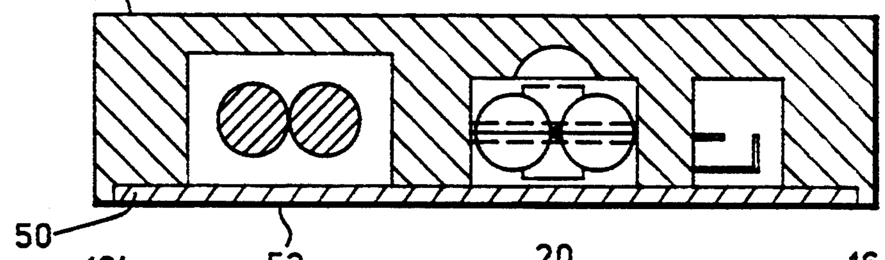
FIG. 3 is a section-view taken generally on lines 3—3 of FIG. 1.

The housing 10 as illustrated is based on a housing formed of a wooden block. The housing is formed with a recess 50 at one side for receipt of a cover 52, as shown in FIG. 3. The cover is fit within the recess 50 and forms a flush side. The cover may be held in place by any suitable means such as screws, nails, glue and the like. In lieu of a backing plate, another option is to have the bottom of the block open to the cavities whereby the electronics are mounted onto a bottom plate and the entire assembly inserted from the bottom. The top surface of the housing is preferably provided with two or more depressions 54 to hold two or more of the balls 24 and 26 or can be a single storage depression which can hold multiple balls.

Figure 4:
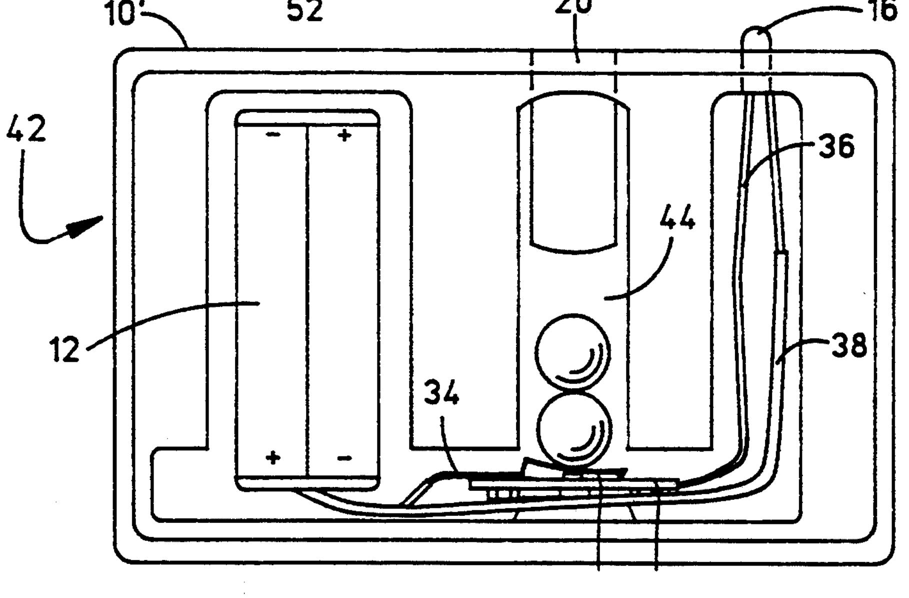
FIG. 4 is a view like FIG. 1 of an alternate embodiment.

Referring to FIG. 4 an alternate embodiment is illustrated wherein like numbers identify identical elements. The embodiment designated generally by the numeral 42 is provided with a substantially uniform diameter containment shaft or cavity 44 disposed directly over a single pole switch. The pole switch has a spring contact 46 connected to lead 34 from the battery and a fixed contact 48 connected to the lead 38 to the LED 16. In this embodiment the leaf spring contact 46 is designed to remain in the non-contact or non-closed position with the presence or weight of a single sphere but is responsive to two or more spheres for closing.

It is apparent that either embodiment may be designed to require the presence of any number of actuating spheres or other similar elements to complete the circuit. It may also be constructed with multiple lights and switches for multiple or combinations of signals.

In operation, parties will enter into a pre-arranged understanding as to what a signal will mean. When a party wishes to communicate or signal the predetermined message, he or she either places or fails to place a ball in the in the cavity. The second party then places a ball in the cavity to learn of the first persons response. If the first person failed to place a ball in the cavity, the light will not light when the second party places a ball in it. In either event the second party will know the state of mind or intent of the first party.

While I have illustrated and described my invention by means of specific embodiments, it is to be understood that numerous changes and modifications may be made therein without departing from the scope of this invention as defined in the accompanying claims.

I claim:

1. A signal device for indicating consent between two parties, comprising:
- a ball member;
- a housing having a cavity;
- an opening in an upper portion of said housing communicating with said cavity;
- an indicator light on an exterior portion of said housing;
- a source of electrical power;
- circuit means including a switch for connecting said source of electrical power to said indicator light, said switch being disposed in said cavity and responsive to engagement by a minimum of at least two actuator means for activating said switch; and
- whereby said actuator means insertable via said opening into said cavity for engaging and closing said switch for closing said circuit means and activating said indicator light in response to displacement of ball member within said cavity.

2. A signal device according to claim 1, wherein said multiple actuator means is two in number.

3. A signal device according to claim 2 wherein said actuator means are spheres.

4. A signal device according to claim 1 wherein said switch has multiple contacts in series.

5. A signal device according to claim 1 wherein said switch has a vertically extending projection for diverting said activator means to either side thereof.

6. A signal device according to claim 5 wherein said switch includes a moveable contact on opposite sides of said projection for engagement by said activator means.

7. A signal device according to claim 6 wherein said activator means is sphere.

8. A signal device according to claim 7 wherein said cavity is shaped to confine said spheres to a position resting on said moveable contacts.

9. A signal device according to claim 1 wherein said switch has a single moveable contact normally biased to an open position.

10. A signal device according to claim 9 wherein said switch is disposed at the bottom of said cavity; and
- said actuator means is a pair of balls, both of which are required to actuate said switch.

11. An apparatus for generating a signal for indicating consent between two parties, comprising:
- a ball member;
- a generally box-like housing having a cavity;
- an opening in a top of said housing communicating with said cavity;
- an indicator light on an exterior portion of said housing;
- a source of electrical power including a battery in said housing;
- circuit means including a switch for selectively connecting said source of electrical power to said indicator light, said switch being disposed in said cavity and responsive to a minimum of at least two actuator members for activating said switch; and
- whereby said actuator members are positionable via said opening into said cavity for engaging and closing said switch for closing said circuit means and activating said indicator light in response to displacement of ball member within said cavity.

12. A signal device according to claim 11, wherein said multiple actuator members comprise at least two spheres.

13. A signal device according to claim 12 wherein:
- said switch has multiple contacts in series;
- a vertically extending projection for diverting said activator means to either side thereof; and
- said switch includes a moveable contact on opposite sides of said projection for engagement by said activator means.

14. A signal device according to claim 13 wherein said members are spheres and said cavity is shaped to confine said spheres to a position resting on said moveable contacts.

15. A signal device according to claim 11 wherein:
- said switch has a single moveable contact normally biased to an open position;
- said switch is disposed at the bottom of said cavity; and
- said actuator means is a pair of balls, both of which are required to actuate said switch.

* * * * *